United States Patent [19]

Olsson

[11] 3,940,154
[45] Feb. 24, 1976

[54] END FACE SEAL ASSEMBLIES
[75] Inventor: Burton K. Olsson, Park Ridge, Ill.
[73] Assignee: Chicago Rawhide Manufacturing Company, Elgin, Ill.
[22] Filed: July 3, 1974
[21] Appl. No.: 485,363

[52] U.S. Cl. .................................................. 277/92
[51] Int. Cl.² ....................................... F16J 15/34
[58] Field of Search ......... 277/9, 92, 96, 96 A, 133, 277/134, 32, 237

[56] References Cited
UNITED STATES PATENTS

| | | | |
|---|---|---|---|
| 3,086,782 | 4/1963 | Peickii et al. ........................... | 277/92 |
| 3,241,844 | 3/1966 | Morley .................................. | 277/92 |
| 3,272,519 | 9/1966 | Voitik ................................... | 277/92 |
| 3,744,805 | 7/1973 | Heinrick .............................. | 277/96 A |

Primary Examiner—Robert I. Smith
Attorney, Agent, or Firm—James T. FitzGibbon

[57] ABSTRACT

An improved rotary end face mechanical seal assembly particularly adapted for intermittent use in severe service environments. The seal comprises at least one relatively stiff primary sealing ring having an axially facing, radially directed end face portion, at least a part of which, in use, engates an oppositely directed member to form a primary seal band area. The primary seal ring includes an at least partially outwardly directed seat for receiving a portion of a secondary sealing and driving member which is made from an elastomeric material, which engages the seat so as to form a secondary seal, to transmit driving torque to said primary seal, and to prevent relative rotation between the primary seal ring and the secondary sealing and driving member. The secondary member also transmits an axial end load to the primary seal face to achieve the primary seal. The primary seal ring contains means forming a lubricant reservoir, so that lubricant may be retained in the area of the primary sealing surface even when the apparatus containing the seals is not in use, and so that, upon starting up, the lubricant will be supplied immediately to the seal faces lying immediately adjacent the seal band area. In a preferred form, the seal assemblies are formed from substantially identical pairs of seal parts, arranged in a mirror image relation.

6 Claims, 6 Drawing Figures

END FACE SEAL ASSEMBLIES

BACKGROUND OF THE INVENTION

The present invention relates generally to so-called mechanical seals. More particularly, the invention concerns rotary end face seals, that is, seals in which the primary seal is usually formed between oppositely directed faces of two seal units lying in opposed relation and making contact along a seal band formed on or forming a part of the respective radial or end faces of the seal rings. Seals made according to the present invention are an improvement over known seals of a somewhat similar character, such as seals of the type shown and described in U.S. Pat. No. 3,241,843.

Seals of this type are sometimes referred to as heavy duty seals or grit seals, based on their well-known ability to be used in severe service environments. These seals are commonly used as seals for the track rollers or final drives of earth moving equipment in other track laying vehicles such as military tanks, or in other severe applications, such as in off-the-road scrapers, graders or other vehicles.

Seals such as those described and claimed in U.S. Pat. No. 3,241,843 have met with remarkable success by reason of their extreme reliability, and their ability to function as dirt excluders and lubricant retainers, even under extremely severe conditions.

By way of example, such seals routinely operate successfully in sand, water, mud, and rock and gravel environments, and in desert areas, in temperature climates, and in regions where the temperature is 20° F. below zero or lower. Such seals perform their primary function of sealing under these conditions both because the end faces are precisely finished and because the seal rings themselves are accurately positioned and loaded by cooperating elastomeric rings of various configurations, with such rings also applying the desired range of loading forces, providing a secondary seal, and also providing sufficient driving torque so that relative rotation occurs only at the primary seal faces of the seal rings and not between the seal rings and the elastomer, or between the elastomer and a part of the machine housing. By "secondary seal" is meant any seal which is made between parts which do not undergo rotation relative to each other. Whereas seals of this type most commonly comprise an identical pair of seal rings and an identical pair of secondary sealing and driving members, arranged in mirror image relation, certain applications of these seals may be made where only one primary and one secondary member are used, with the mating surface being of some configuration other than that of the other parts of the seal assembly. The principles of the present invention are applicable to both types of seals.

As is often the case with seals of the type described above, in spite of the great success with the basic concept there is still the need for further improvements, particularly where the seals may be used in applications not originally envisaged by the designer.

Specifically, seals of the general type with which this invention is concerned are often used where lubricant is present only when parts associated with the seal undergo continuous motion, or where such parts are operated with reasonable frequency. By way of example, in final drive applications, a driving mechanism must be provided to transmit power from a transmission, differential, or similar assembly, to drive rollers or sprockets. In such cases, it is common for seals, and perhaps the bearings, to achieve lubrication by reason of splash action or flow caused by motion of the parts protected by the seal unit.

In the case of heavy duty vehicles such as military tanks, earth moving equipment or the like, it is not uncommon for the vehicle to be out of active use for extended periods, even where this is not economically desirable. For example, construction equipment is sometimes left unused for several months or more if weather prohibits construction operations. Moreover, considerable time elapses between the time an earth mover or other machine is taken out of service at one location and the time when it is placed in service in another location, or is undergoing repair for reasons other than those connected with repair of the sealed parts. In such cases, it has sometimes been found that seal damage, or even failure, occurs when there has been no movement of the sealed part for some time, during which lubrication to the seal is non-existent. Accordingly, upon start up, especially under extreme conditions, the seal may be damaged or its life shortened by lubrication failure occurring between the time the mechanism is operated and the seal can be properly lubricated by oil transferred thereto from or by other moving parts of the mechanism.

Because heavy duty seals of the type with which the present invention is concerned are designed for long life, they have customarily been formed with seal faces of considerable radial extent, such faces being finish ground so that, as wear occurs, the seal band moves progressively inwardly from the outermost periphery of the seal units to an area lying somewhat radially inwardly thereof. However, in most applications, by the time the seal band has moved inwardly a measurable amount, such as one-third or one-half of the radial extent of the seal face, the seal is generally ready to be discarded. The length of time to wear such a seal to this extent is usually several thousand hours or more, however, and the parts associated with the seal have by that time generally been worn out and discarded.

In view of the foregoing circumstances, it is an object of the present invention to provide a seal unit having an extended life in relation to similar but unimproved prior art seal.

Another object is to provide a heavy duty seal unit which includes a lubricant reservoir intended to eliminate or diminish the likelihood of dry starting after non-use of the mechanism for an extended time.

Another object is the provision of a heavy duty seal having fins, vanes or slots associated with the lubricant reservoir so as to insure distribution of the lubricant about the inner periphery of the end face of the seal upon initial start-up.

A further object is to provide a seal having a lubricant reservoir as well as means for creating turbulence within the reservoir upon relative rotation of the seal ring so as to facilitate lubricant circulation as well as increased heat transfer by the lubricant and the parts lubricated thereby.

A still further object is to provide a heavy duty grit seal having means for receiving and retaining a certain amount of lubricant during operation and for retaining at least a certain amount thereof in the region of the seal faces when rotation ceases, with such amount of lubricant being greatly increased relative to the merely incidental amounts of lubricant, if any, retained in this area by prior art seals.

Another object is to provide a primary seal ring having the characteristics referred to above and which is operable with various known types of secondary seal rings, including seal rings having parallelogram cross sections, generally equivalent cross sections, and those of quite different cross sections as well.

A further object is to provide an improved lubricant retaining seal which is especially useful in seals of mirror image or associated pair design, as well as with other designs.

These and other objects and advantages of the invention, including those inherent in the invention, are accomplished by providing a seal unit having at least one primary seal ring of a relatively rigid material, and at least one elastomeric or other flexible secondary seal ring associated with the ring in sealing and driving relation therewith, with the primary seal ring having a seat for the driving ring, a generally radially extending, axially directed, primary seal face, and means lying radially inwardly thereof and defining a reservoir for receiving lubricant, and, in some cases, ribs, vanes, or slots on the reservoir-defining surfaces of the primary seal ring to aid in lubricant transfer and to provide lubricant turbulence in use of the seal assembly.

The manner in which these and other of the objects of the invention are achieved will become more clearly apparent when reference is made to the accompanying detailed description of the invention set forth by way of example, and to the drawings, in which like reference numbers indicate corresponding parts throughout.

DESCRIPTION OF THE PREFERRED EMBODIMENTS OF THE INVENTION

In the specification and in the appended claims, parts are sometimes described or identified with the use of terms such as "upper", "lower", "front", "rear", or other terms of position or relation. However, it will be understood, as used herein, and in the appended claims, that seals according to the invention are capable of use in any position or orientation and that descriptions and showings thereof in particular orientations are used merely for purposes of illustration and not in a limiting sense.

It will be further understood that the type of seal illustrated is one wherein sand, mud, and grit are excluded from a desired portion of the machine, and wherein oil is retained, even though the seal is capable of other and further applications including, but not limited to, sealing of water, greases, oils, various solvents and other liquid materials.

Figure 1:
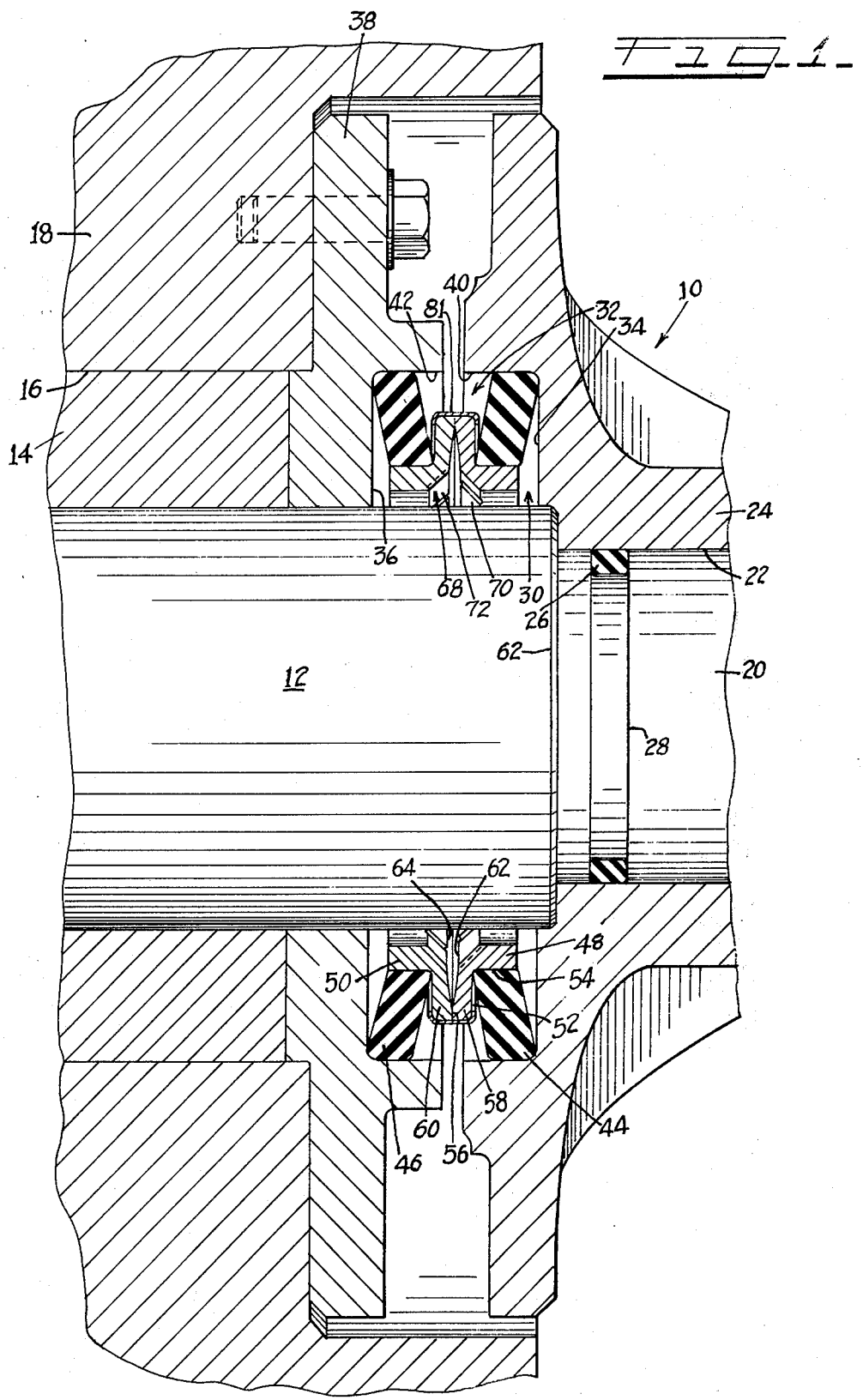
FIG. 1 is a vertical sectional view of a part of a machine showing one form of seal made according to the invention disposed in a desired position within the housing.

Referring now to the drawings in greater detail, FIG. 1 illustrates a portion of a track roller generally designated 10 and shown to include an axially extending shaft 12 received or journaled within a bushing 14 pressed into a bore or opening 16 in a machine member 18. A reduced diameter end portion 20 of the shaft 12 is press fit into an opening 22 in an end cap 24 which is received over the shaft end 20. A rubber ring 26 shown to be disposed in a ring groove 28 prevents leakage of fluid between the shaft end portion 20 and the end cap 24, forming an effective static seal.

Lying radially outwardly of the shaft 12 is a lubricant receiving cavity generally designated 30 and defined in part by the seal assembly 32 of the invention and by walls 34, 36, respectively, in the end cap 24 and a companion flange 38 forming a part of the machine member 18. Axially extending cylindrical walls 40, 42 in the end cap 24 and flange 38, respectively, further define the seal receiving area, with the walls 40, 42 being concentrically aligned and having the same diameters.

As shown in FIG. 1, the seal assembly 32 consists of a pair of secondary sealing and driving members 44, 46 and a pair of primary seal rings 48, 50. The primary and secondary seal rings 44, 48 are shown to be mirror images of their counterparts 46, 50, such construction being preferred for reasons which are referred elsewhere herein.

Each of the secondary seal rings 44, 46, is annular, and each is in the form of a "dished" or Belleville washer, that is, each is of a shape sometimes referred to as frustoconical. When viewed in cross section, the secondary seal rings generally conform in shape to a parallelogram, it being understood that, in keeping with common practices in the art, the members will have rounded or radiused corner portions. Moreover, because the rings are made from an elastomeric material, the cross-sectional configuration of the rings change upon installation, and during use. In other words, when the seal installation is complete, the rubber rings 44, 46 form a tight, torque-transmitting interference fit between their associated machine members 24, 38 and the respective primary seal rings 48, 50. Upon axial compression, the rings 44, 46 lie in a more vertical plane than they would in a relaxed or unloaded condition. Furthermore, the unconfined portions of the rubber rings bulge somewhat outwardly as an axial compressive load is applied to the seals. In other words, as the installation is made, the axial end load placed on the rubber members creates not only the required axial seal force, but also develops a radial compressive force which wedges it securely between the seal ring and the housing part. Upon release of the axial load, the rubber member relaxes and it can be easily removed from both the counterbore and the sealing ring.

The primary seal rings 48, 50 are of similar or identical construction to each other, and in the embodiment of FIG. 1, each includes a pair of divergently related, generally radially and axially extending surfaces 52, 54 which define therebetween a generally right-angled seal for receiving the leading corner or edge portion of the secondary seal 44. The primary seal or so-called seal band itself is formed at the interface 56 lying between two oppositely directed end face sealing surface portions lying initially adjacent the radially outermost portions 58, 60 of the primary seal rings 48, 50. Just radially inwardly of the surfaces forming the primary seal 56 are a pair of almost flat but slightly radiused end face surfaces 62, 64.

Figure 2:
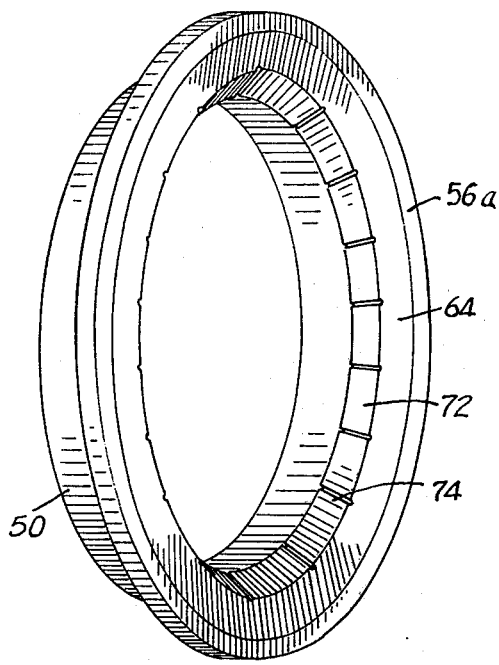
FIG. 2 is a perspective view of one form of primary seal ring used in the invention.
Figure 3:
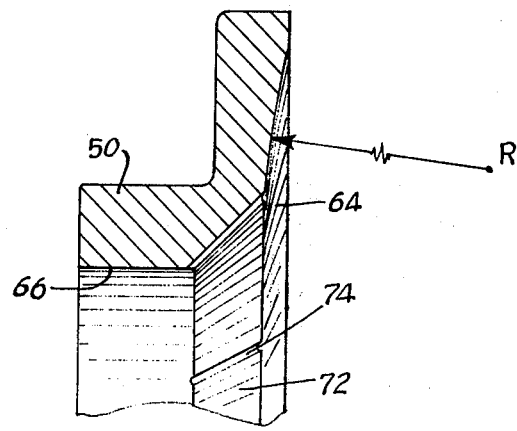
FIG. 3 is an enlarged vertical sectional view of a part of the primary seal ring of FIG. 2.

Referring again to the formation of the primary seal, FIGS. 2 and 3 illustrate that, in respect to a typical primary seal ring such as the ring 50, the end face of the ring itself includes a radially outermost area 56a, a highly polished annular surface which, while not truly flat in a relaxed condition, is ground on such a large radius as to be virtually perfectly flat when the seal is installed and placed under a typical load. Radially inwardly of this surface 56 is a transition surface 64 which is likewise not truly a flat surface. This surface 64 is ground on a radius smaller than the radius of the surface 56a but still very large in relation to the diameter of the seal. Typically, the radius R (FIG. 3) of this surface might be 60, 80 or 100 inches, in the case of a seal having a 2-inch to 6-inch diameter, for example.

As referred to above, it is known in the art that in the case of seals manufactured in this way, wear occurring during continued use of the seal will cause the seal band 56 to move gradually inwardly and yet to maintain a tight seal. Accordingly, the highly polished or lapped initial seal band 56a may be thought of as only a particular portion of the end face as a whole, it being understood that the seal band proper moves gradually inwardly as wear occurs. In prior art designs, the radially inwardly directed, axially extending annular surface 66 of the seal ring 50 joined the inner periphery surface 64 at a virtually square corner. Because of the large size of the radius R, the space between opposed surface 62, in a typical prior art seal, was only a few thousandths of an inch upon initial installation. As wear occurred, this clearance was gradually further reduced. In any case, the volume lying between the two seal rings outwardly of the axial surface 66 and radially inwardly of the seal band 56a was extremely minute. Consequently, no significant amount of oil could be accumulated in this area, and in the event an apparatus containing the sealed parts were allowed to remain inactive for a long period of time, subsequent start up would result in a virtually dry condition of the seal faces. In those installations wherein the oil level did not rise at least to the level of the seal faces, such as in final drive installations, the problem of dry start up can be quite severe. Needless to say, failure of a seal which is intended to last for the lifetime of the sealed parts not only involves a certain expense per se, but also may cause replacement of far more expensive parts, and in any case, undesirably results in expensive "down time" for the equipment.

According to the present invention, heavy duty seals of the type just described are advantageously provided with a reservoir generally identified at 68 and shown to be defined in part by two tapered wall surfaces 70, 72. In seal ring 50, the wall 72 extends between the radially inner portion of the surface 64 and the axial surface 66. As shown in FIG. 1, the wall 70 extends between counterpart surfaces on the ring 48.

Disposed on the surfaces 70, 72 are a plurality of ribs or vanes 74, which extend generally radially and terminate at surfaces 64, 66.

In the use of the form of seal shown in FIGS. 2 and 3, it has been found that sufficient oil may be accumulated so that the problem of dry starting can be virtually eliminated, even where the machines having the sealed parts are immobilized for several months, or a year or more, for example.

Furthermore, additional advantages are created by reason of the existence of the ribs 74. First, upon initial start up, the lubricant is often quite viscous, and the ribs insure rapid movement of the lubricant about the periphery of the seal rings. As the lubricant becomes less viscous, the ribs or vanes not only continue to direct additional lubricant to seal surfaces lying away from the portion of the seal immersed in oil, but also tend to create a turbulent or stirring action which both insures good oil circulation in the critical seal face area and also tends to reduce operating temperature of the seals. By creating a turbulent or stirring action, a continuing supply of fresh, clear oil is maintained, and the removal of dirt and impurities from the seal faces is effected. Location of the reservoir near the inner periphery of the seal ring has desirably been found not to weaken the seal ring significantly, but has been found to provide significant savings of the highly expensive seal ring material. Moreover, by locating the reservoir at the inside of the surface 64, seal life is not measurably shortened, because a significant amount of room is still provided for inward movement of the primary seal band as wear occurs.

Figure 4:
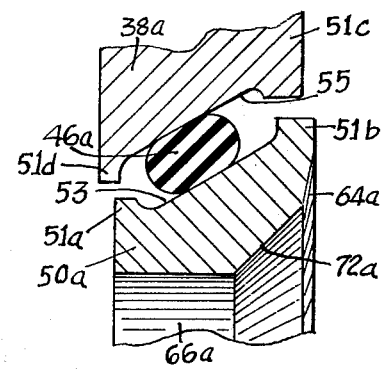
FIG. 4 is a fragmentary vertical sectional view of a modified form of seal made according to the invention.
Figure 5:
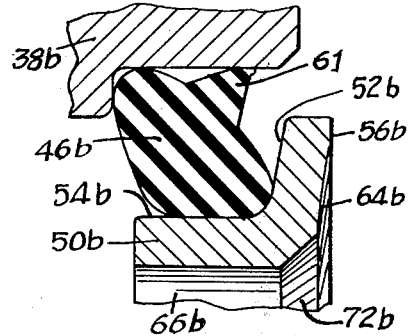
FIG. 5 is a fragmentary vertical sectional view of a further modified form of seal made according to the invention.
Figure 6:
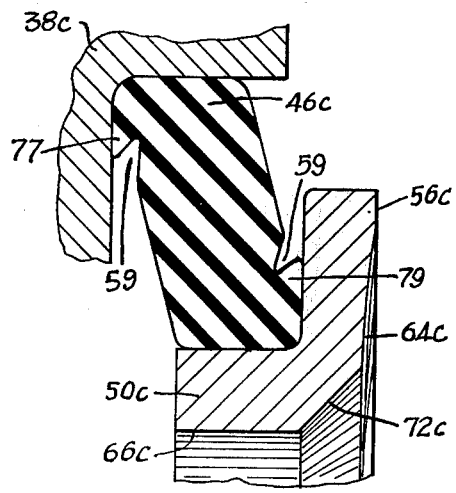
FIG. 6 is a fragmentary vertical sectional view of a still further form of seal made according to the invention.

Referring now to FIG. 4–6, the principles of the invention are shown to be applied to other forms of so-called two-piece or rubber loaded seals.

FIG. 4 shows one-half of a mirror image seal design wherein the primary seal ring 50a includes an axially extending inner surface 66a and an end face surface 64a joined at their respective edges to an inclined, reservoir-defining wall 72a. In the construction of FIG. 4, the secondary seal member 46a is in the form of a flattened or so-called toric O-ring adapted to roll up and down on the seat portion of the ring 50a as the seal moves in and out under initial load and dynamic conditions. FIG. 4 shows that the seat for receiving the secondary sealing and driving member 46a comprises a single inclined or ramp surface 53, and that its counterpart surface on the machine member 38a is likewise an inclined or ramp surface 55. Small flanges 51a, 51b, 51c and 51d are provided, respectively, on the seal ring 50a and the machine member 38a to limit movement of the member 46a.

FIG. 4 shows the surface 72a without any ribs 74, but it is understood that any number of these ribs may be provided if desired. In this connection, it will be appreciated that slots or cuts may be provided to take the place of the ribs 74, and that these ribs might be disposed either radially or at an angle with respect to a true radius of the seal. While the seal of FIG. 4 differs from the seal shown in FIGS. 1–3 in a number of important structural and functional particulars, the reservoir and ribs or vanes of the present invention are equally advantageously used therewith. If desired the half of the seal shown in FIG. 4 may be used with a non-mirror image mating part.

FIG. 5 shows one part of a mirror-image type seal which is similar to that shown in FIGS. 1–3, except that the shape of the rubber secondary sealing and driving member 46b differs therefrom in detail. The seal ring 50b in FIG. 5 includes the axial surface 56b, the end face surface 64b having a seal band area 56b thereon, and also includes surfaces 52b, 54b corresponding to their counterparts in FIG. 1. In the form of seal illustrated in FIG. 5, the surfaces 52b, 54b are separated by an angle of somewhat greater than 90°. While the rubber secondary sealing and driving member 46b is not shown as being precisely in the shape of a parallelogram, the member 46b does, in use, engage both the radial and axial surfaces 52b and 54b of the ring 50b and the counterpart radial and axial surfaces of the housing or machine member 38b. A plurality of small conical mounting barbs or studs 61 are shown to be provided in the construction of FIG. 5 to aid in initial placement of the ring 46b.

As in the forms of seals shown in FIGS. 1–4, an inclined surface 72b extends between the forward edge of the axial surface 66b and the inner edge of the radial surface 64b to define a part of the reservoir for the lubricant. Seals such as those illustrated in FIG. 5 may be used in mirror image form, or may be used with other mating members, and such seals may advantageously include ribs or vanes such as those shown at 74 in FIGS. 2 and 3.

FIG. 6 shows a seal construction wherein both the primary seal ring 50c and the machine member 38c include radial and axial surfaces defining the seat for the elastomeric sealing and driving member 46c. The axial surface 66c on the ring 50c terminates at its forward edge in the inclined surface 72c which extends forwardly and radially outwardly to the inner edge of the large radius end face seal surface 64c. The outer periphery 56c is shown to be provided for the formation of an initial seal band therein. Seals of this type are also commonly used in mirror image relation although they are also capable of being employed with mating members of another design. The shape of the secondary sealing and driving member 46c is virtually identical to that of the members 44, 46 of the form of seal shown in FIG. 1, the only difference being the provision of small feet 77, 79 which engage the radial surfaces of the machine member and seal ring, respectively, to add shearing stiffness to the member 46c, which, as a whole, would otherwise have reduced stiffness because of the notches 59 therein.

Referring again to the drawings, it will be noted that the mirror image seals of the forms shown in FIGS. 1–3 and 5–6 possess the additional advantage of being able to be protectively unitized by the addition of a seal-retaining and protecting band 81 (FIG. 1) which may be the same as that referred to in U.S. Pat. No. 3,241,843.

Preferred embodiments of the invention having been described in detail by way of example, it is anticipated that further and other modifications will be apparent to those skilled in the art, and it is anticipated that such modification may be made without departing from the spirit of the invention or the scope of the appended claims.

I claim:

1. An end face seal assembly for use in severe environments, said assembly comprising at least one generally annular, primary sealing ring having an axially facing, radially directed end face portion, at least a part of which is adapted to engage an oppositely directed mating part along a primary seal band area, an at least partially radially outwardly directed seat on said ring for receiving a portion of a secondary sealing member in driving engagement with said seat, an axially extending, radially inwardly directed annular inner ring surface, and a secondary sealing and driving member made entirely from an elastomeric material, said secondary member having at least a portion thereof adapted for snug secondary sealing engagement with said seat portion said beveled surface including a plurality of vanes disposed thereon said vanes being adapted to create turbulent flow of said lubricant whereby the distribution of said lubricant about the periphery of said seal ring will be facilitated, of said primary seal ring when an axial force is applied to said secondary sealing and driving member and when said member is at least partially confined against radially outward expansion, said secondary sealing and driving member being readily removable axially of said seat upon release of said axial forces and said radial confinement, said primary sealing ring further including at least one beveled surface defining a reservoir for receiving and retaining seal face lubricant, said surface lying between and joining an edge of said annular inner ring surface and an inner margin of said end face portion, said beveled surface being inclined at a substantial angle with respect to said end face portion, whereby, in the use of said seal, sufficient lubricant will be retained in said reservoir adjacent said end face portion to insure lubrication of said seal band upon initial movement of said machine parts.

2. A seal assembly as defined in claim 1 wherein said secondary sealing and driving member is in the form of a Belleville washer, having the cross section of a parallelogram with inclined front and rear surface portions, and wherein said seat for receiving said secondary sealing and driving member is defined by axial and radial surfaces disposed at generally right angles to each other.

3. A seal assembly as defined in claim 1 wherein said secondary sealing and driving member is in the form of an O-ring, and wherein said seat for receiving said secondary sealing and driving member is in the form of an inclined ramp comprised of a single annular surface and facing radially outwardly and rearwardly of said end face portion of said seal ring.

4. A seal assembly as defined in claim 1 wherein said secondary sealing and driving member is generally in the form of a parallelogram, said member having areas of reduced cross section near its inner and outer ends, and further having areas of increased cross sections lying outwardly of said reduced cross section areas.

5. A seal assembly as defined in claim 1 wherein said seal assembly is received within a machine part having a seat adapted to receive at least one other surface portion of said secondary sealing and driving member, said seat having a configuration similar to the configuration of the seat formed on said primary sealing ring.

6. A seal assembly as defined in claim 1 wherein said seal assembly comprises a pair of primary sealing rings and a pair of said secondary sealing and driving members, said rings and members, respectively, being of substantially identical configuration and being disposed in a mirror image relation in position of use.

* * * * *